United States Patent [19]

Mills, Jr.

[11] 4,097,737
[45] Jun. 27, 1978

[54] EPITHERMAL DIE-AWAY POROSITY LOGGING

[75] Inventor: William R. Mills, Jr., Dallas, Tex.

[73] Assignee: Mobil Oil Corporation, New York, N.Y.

[21] Appl. No.: 737,933

[22] Filed: Nov. 1, 1976

[51] Int. Cl.² ............................................. G01V 5/00
[52] U.S. Cl. .................................... 250/269; 250/262
[58] Field of Search ........................ 250/270, 269, 262

[56] References Cited

U.S. PATENT DOCUMENTS

| | | | |
|---|---|---|---|
| 2,769,915 | 11/1956 | Tittle | 250/390 |
| 3,240,971 | 3/1966 | Morgan | 250/390 |
| 3,264,477 | 8/1966 | Hall | 250/390 |
| 3,487,211 | 12/1969 | Youmans | 250/269 |

*Primary Examiner*—Harold A. Dixon
*Attorney, Agent, or Firm*—C. A. Huggett; George W. Hager, Jr.

[57] ABSTRACT

Porosity measurements are carried out by employing a pulsed source of high energy neutrons actuated to irradiate a medium; some of the neutrons returning from the medium are detected by a specially filtered epithermal neutron detector. Control states are generated to define each of an ordered series of successively longer time intervals, the first of which is a few microseconds in length. Counters connected to the detector count representative numbers of the epithermal neutrons during each of the control states. Ratio functions are generated representative of the ratios of the epithermal neutrons counted during successively later equal length combinations of the time intervals. The ratio functions are compared with a predetermined threshold level and a porosity function is established in dependence upon the ratio function which earliest in time with reference to one of the irradiating pulses bears a predetermined relation to the threshold level.

16 Claims, 10 Drawing Figures

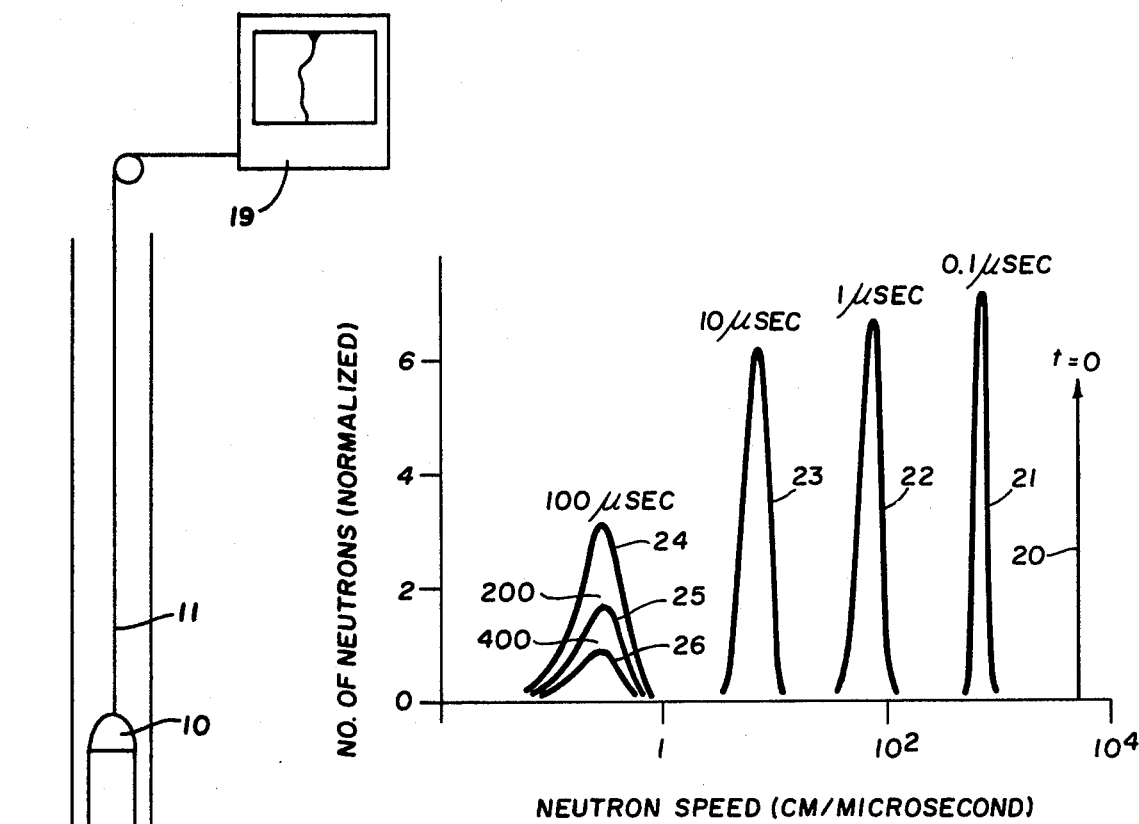
FIG. 2a
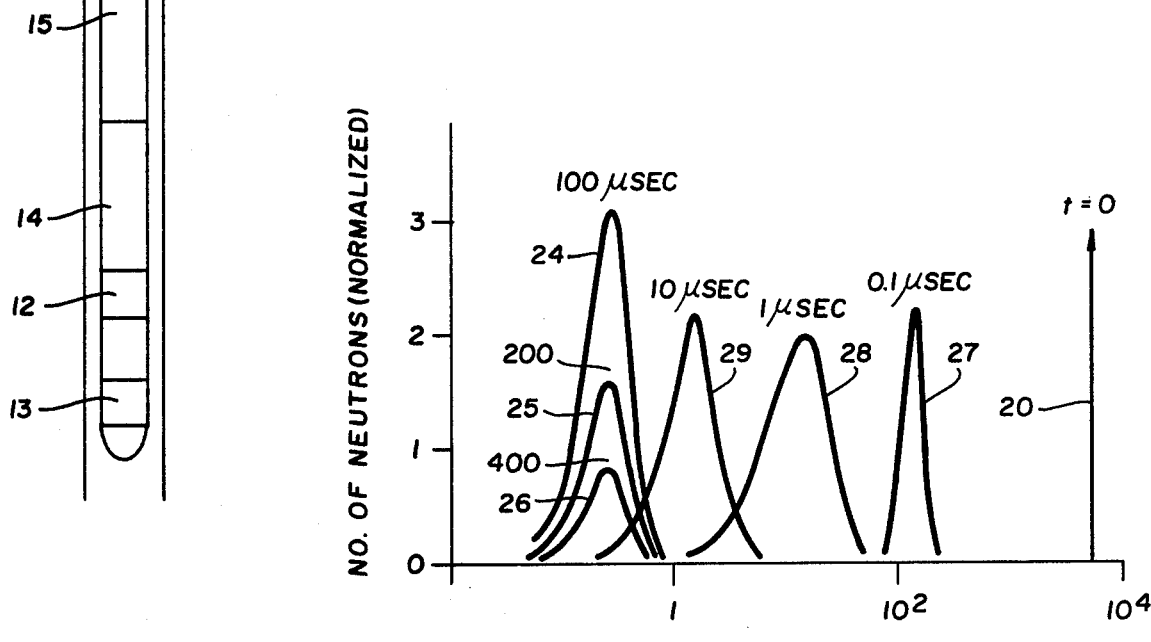
FIG. 1
FIG. 2b

EPITHERMAL DIE-AWAY POROSITY LOGGING

This invention relates to determination of porosity of a medium, and more particularly to epithermal neutron die-away measurements for determination of porosity wherein sensitivity to hydrogen is greatly increased and sensitivity to nonhydrogenous constituents is greatly reduced as compared with prior methods.

BACKGROUND OF THE INVENTION

Systems have heretofore been employed for analyzing the character of inaccessible media such as fluid-bearing earth formations penetrated by boreholes. A conventional and current neutron logging method capable of operating in cased or uncased boreholes is known as dual-detector or compensated neutron logging. It utilizes a steady-state capsule source of high energy neutrons and two thermal neutron detectors. One detector is spaced a greater distance from the source than the other. The ratio of the counting rates is employed as a measure of formation porosity. In another method, thermal neutron die-away logging is carried out utilizing a pulsed source of high energy neutrons (at about 14 Mev). The number of thermal neutrons or thermal neutron capture gamma rays detected at successively longer time intervals following energization of the neutron source is employed to evaluate neutron lifetimes as related to water salinity. It has been found, when neutrons have lost energy to the point that they are in the thermal neutron energy band, i.e., below about 0.05 electron volt, the energy distribution as a function of time does not change character. Rather, the number of thermal neutrons having such distribution gradually decreases with time. The change in the number of thermal neutrons with time constitutes a parameter employed in thermal neutron die-away logging.

Currently, neutron porosity logging is carried out by use of a steady-state capsule neutron source to bombard the formations with neutrons of energy of the order of 4-5 Mev. Porosity is then determined by measuring thermal neutrons with two detectors spaced different distances from the source or utilizing a single detector of epithermal neutrons. The rock matrix seriously interferes with the effect of hydrogen contained in fluid that occupies the pore volume in the matrix. The presence of oxygen, silicon, calcium or carbon in the matrix renders current neutron porosity logging methods relatively less sensitive to porosity than is desirable. Further, it is the custom to calibrate current porosity logging systems in a known formation such as limestone. A logging tool thus calibrated when moved through formations where the lithology differs from that of limestone can and often does lead to erroneous results in terms of formation porosity.

U.S. Pat. No. 3,487,211 discloses use of a pulsed source of fast neutrons. Epithermal neutrons are sensed in order to provide an indicia of porosity. A functional relationship between the number of epithermal neutrons detected during two time intervals is determined.

The present invention is directed to a method and system in which sensitivity to lithology of the medium is reduced, i.e., the dependence of porosity measurements upon the lithology is greatly reduced.

It has been found that high energy neutrons from a pulsed deuterium-tritium (abbreviated, D-T) source lose energy in a unique pattern when they interact with nuclei in a medium. The recognition of this pattern has led to the present invention. Initially the neutrons are all at about the 14-Mev energy level. However, they rapidly moderate. At any instant after cessation of generation of the bombarding neutrons, the neutrons are spread across an energy band. They do not all have the same energy. Over a given time interval, some neutrons experience more collisions than others and some lose more energy than others. In a given medium the spectrum describing the energy distribution of all of the neutrons from a given pulse assumes a constant shape as the neutrons approach the thermal energy level.

BRIEF SUMMARY OF THE INVENTION

The present method and system operates with increased sensitivity to hydrogen and decreased sensitivity to nonhydrogenous components as compared with steady-state neutron logging methods. The invention involves a significant relationship between the epithermal neutron die-away rate and a detector/filter response for a given porosity of a fluid-bearing matrix.

In accordance with the present invention, measurements are limited primarily to neutrons of epithermal energy levels. A 14-Mev neutron source is employed along with a neutron detector sensitive to epithermal neutrons and highly discriminatory against thermal neutrons. The detector is relatively insensitive to high energy neutrons and has a filter that renders it sharply insensitive to thermal neutrons. Ideally, the response of the filter would be a step function with zero response to neutrons of energy below about 0.3 ev and with a unit response to epithermal neutrons above 0.3 ev. Signals are then generated representative of the ratios of the numbers of epithermal neutrons sensed in pairs of successively longer and successively later time gates to provide a measure of die-away rate of epithermal neutrons. The measurements are made at times when it is assured that approximately exponential die-away functions are effective in the attenuation process. More particularly, each ratio is compared with a reference threshold to signal a reliable porosity related function when the ratio bears a predetermined relation to the threshold.

BRIEF DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1 illustrates a well logging system embodying the present invention;

FIG. 2a illustrates variations in neutron speed distribution with time of pulsed neutrons from the source of FIG. 1 in a nonhydrogenous medium;

FIG. 2b illustrates variations in neutron speed distribution with time of pulsed neutrons from the source of FIG. 1 in a hydrogenous medium;

DESCRIPTION OF THE PREFERRED EMBODIMENTS

Figure 4:
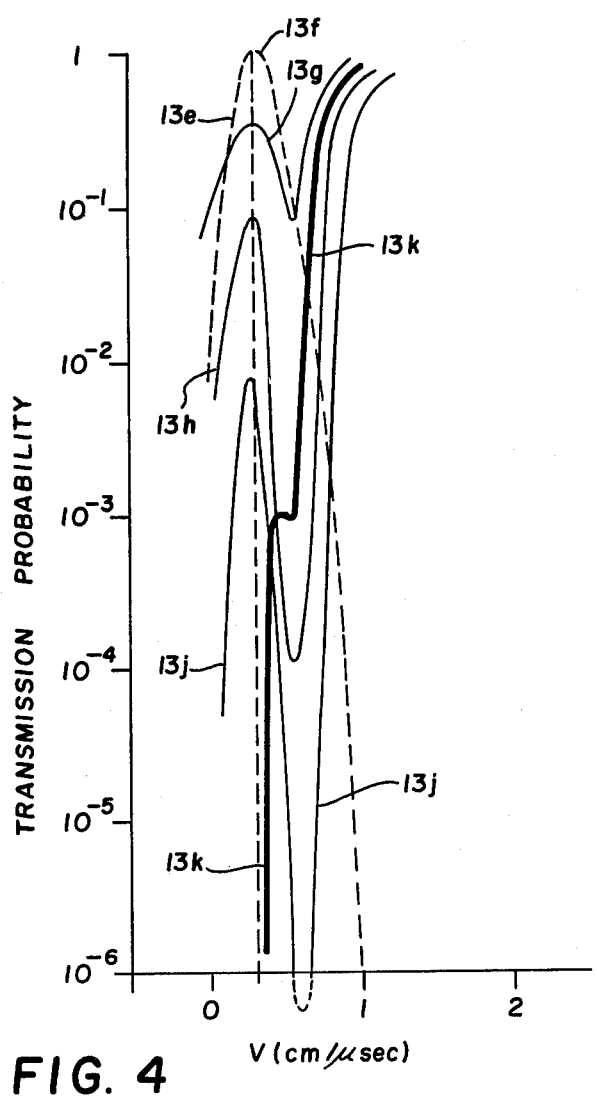
FIG. 4 illustrates responses of a neutron detector with various filters.

In FIG. 1, a well logging system embodying the present invention has been illustrated. A borehole tool 10, supported by cable 11, comprises a high energy neutron source 12 housed near the lower end with an epithermal neutron detector 13 immediately below source 12. A high voltage power supply 14 is provided for the source 12 and a module 15 is provided with circuits for utilization and modification of signals from detector 13. Also included are circuits for the control of the high voltage power supply 14. Cable 11 then extends to a surface unit 19 where a depth dependent parameter is to be recorded, indicative of porosity of the formation through which tool 10 passes. The signal on cable 11 preferably will be an analog signal, specifically a signal which varies as the porosity of the formation varies with depth.

FIG. 2a illustrates the speed-time distribution of neutrons from pulsed neutron generator 12 as they are moderated within a medium such as an earth formation consisting of a rock matrix with zero porosity and containing no hydrogen.

FIG. 2b is similar to FIG. 2a except the medium is a fluid-filled rock matrix having a porosity of about 10%.

In both figures, neutron speed is expressed in centimeters per microsecond along the abscissa. Neutron speed $v$ in cm/microsecond and neutron energy E in electron volts are related by the expression $v = 1.39 \sqrt{E}$. The number of neutrons is plotted as the ordinate; the normalization of the total number of neutrons is the same for both ordinates. At the time of emission (taken as $t = 0$) from the source, all of the neutrons are high energy and are of the same speed as indicated by bar 20. However, as the neutrons travel through the earth formations, their energy is dissipated. For example, at $t = 0.1$ microsecond (one-tenth microsecond after termination of the neutron pulse from source 12), the neutrons have a population distribution on the speed scale represented by curve 21 or curve 27. Some neutrons have lost more or less energy than the average neutron, and this leads to a spread or dispersion in speed. The most probable speed, i.e., the speed corresponding to the peak, is considerably lower for 10% porosity than for zero porosity. In addition, the relative spread in speed is greater for 10% porosity than for zero porosity.

Later, at about 1 microsecond, the population of neutrons on the speed scale is represented by curve 22 or curve 28. By this time the relative spreads have become approximately constant and the most probable speeds have continued to decrease. Still later, at about 10 microseconds, the neutron populations are represented by curves 23 or 29. After a time of the order of about 100 microseconds, the neutrons are in thermal equilibrium with the atoms or molecules of the medium in which they are moving. At this stage the neutrons are called thermal neutrons and have a fixed distribution of speeds that is determined only by the temperature of the medium. The shape of this distribution, called a maxwellian distribution, is indicated in FIGS. 2a and 2b by curves 24, 25 and 26. These curves have the same shapes in both figures, the only difference being a factor of two change in the ordinate scales.

It should be noted that, due to the mechanism by which neutrons lose energy in elastic collisions with nuclei, the shape and location of the speed distribution of epithermal neutrons are dependent primarily on the macroscopic elastic scattering cross section and the average mass of the assemblage of scattering nuclei. This dependence is illustrated, for example, by curve 23 in FIG. 2a and curve 29 in FIG. 2b. The most probable, or peak, speed decreases with time faster for nuclei with large elastic scattering cross sections and low mass. The spread or dispersion in speed is related only to the mass of the nuclei present; it is larger for nuclei with low mass. Thus the presence of hydrogen, with its very low mass, causes the distribution represented by curve 29 in FIG. 2b to be broader and located at a lower peak speed, at a given time, than the corresponding curve 23 in FIG. 2a which is representative of a medium containing no hydrogen.

It is generally understood that the boundary between thermal and epithermal neutrons, though somewhat arbitrary, is normally placed at about 0.1–1 electron volts, or about 0.5–1.4 cm/microseconds. It will be noted that curve 24 is centered at about 0.3 cm/microsecond. As above explained, the shape of the thermal neutron distribution does not change with time. However, the magnitude of the curve does change. More particularly, at 200 microseconds curve 25 is representative of the thermal neutron distribution. At 400 microseconds, curve 26 would be applicable.

The present invention utilizes measurement of the die-away rate of epithermal neutrons, i.e., neutrons with energy greater than about 0.3 ev or speed greater than about 0.7 cm/microsecond. For this purpose, a detector 13 in FIG. 1 of a particular configuration is employed together with the electronic circuit in the unit 15 having a response and sequencing control for translating rates at which epithermal neutrons are detected by detector 13 into a function representative of the porosity of the formations in the region of tool 10.

Figure 3:
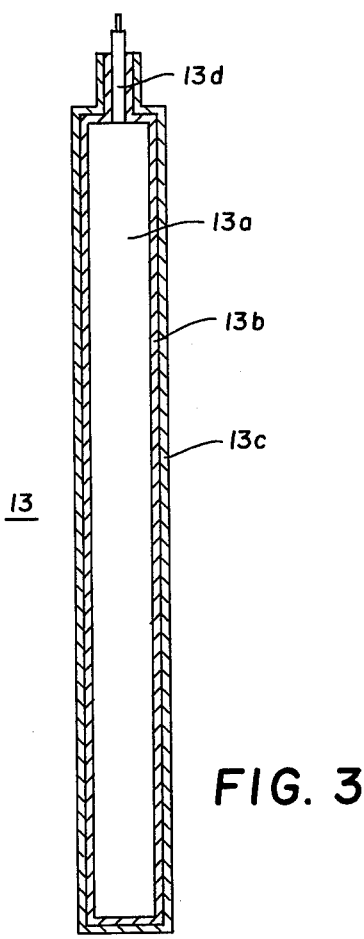
FIG. 3 illustrates an epithermal neutron detector of FIG. 1.

A preferred construction for detector 13 is shown in FIG. 3. Detector 13 comprises a tube 13a which, for example, may be a helium-3 detector of the type manufactured and sold by Reuter Stokes, Cleveland, Ohio, and identified as Catalog No. RS-P4-0806-10. Detector 13 includes a compound filter. In the present example, the filter comprises a layer 13b of cadmium surrounded by a layer 13c of gadolinium. The cadmium layer preferably is about 8 mils thick. The gadolinium layer 13c is about 10 mils thick. The combined effect of the coatings 13b and 13c is to provide a filter having a relatively sharp cut-off as to be insensitive to all neutrons at and below a speed of about 0.7 cm/microsecond or an energy of about 0.3 electron volts. Counter tube 13a is sensitive to both thermal and epithermal neutrons, i.e., neutrons above 0.3 electron volts. By reason of their inherent characteristics, helium-3 neutron detectors are relatively insensitive to high energy neutrons. Thus, the counting rate indicated by pulses on output channel 13d from the detector tube 13a, effectively represents only epithermal neutrons.

FIG. 4 illustrates the necessity of having a filter in detector 13 to render the detector system highly sensitive to epithermal neutrons and highly insensitive to thermal neutrons.

Curve 13e is a plot of the speed distribution of thermal neutrons. It is a maxwellian distribution and is characteristic of thermal neutrons found in nature, regardless of the neutron source. The peak 13f of curve 13e, while slightly temperature sensitive, is not significantly so. Peak 13f will shift only slightly higher under higher temperatures.

The compound filter of detector 13 is designed to impart, as closely as possible, a step function response to detector 13 such that ideally it will not be responsive to thermal neutrons, the distribution of which is represented by curve 13e. Traditionally, epithermal neutron detectors have comprised a thermal neutron detector such as tube 13a together with a layer of cadmium. Curves 13g, 13h and 13j illustrate the transmission characteristic of cadmium filters of 3 mils, 10 mils and 20 mils thickness, respectively. It will be noted that each of the responses has a maximum at about the same speed as the maximum in the curve 13e, i.e., at about 0.25 cm/microsecond. Thus, the cumulative effect is to render a thermal neutron detector coated only with cadmium undesirably sensitive to thermal neutrons even though some sensitivity to epithermal neutrons is also achieved.

By combining a cadmium coating 13b of about 8 mils thickness with the gadolinium layer 13c of about 10 mils thickness, a transmission characteristic such as represented by the curve 13k is achieved. Curve 13k represents substantially a step function filter response at an energy level of about 0.3 electron volt, i.e., in the region of 0.7 cm/μsec. Such a detector is about optimum for epithermal neutron die-away measurements.

The fact that an approximately optimum filter response exists may be seen by again considering FIGS. 2a and 2b. For ease and convenience in making timed measurements of epithermal neutrons, it is desirable to extend the measuring process to times that are as long as possible following the emission of fast neutrons from the source. As indicated in FIGS. 2a and 2b, this requirement implies that epithermal neutrons of as low a speed as possible should be detected. On the other hand, if the detector is made responsive to neutrons with too low speed, an appreciable thermal neutron component will be detected. The requirement of detecting epithermal neutrons with speeds as low as possible, while detecting as few thermal neutrons as possible, implies that there is some optimum speed or range of speeds below which neutrons should not be detected and above which they are detected.

Figure 5:
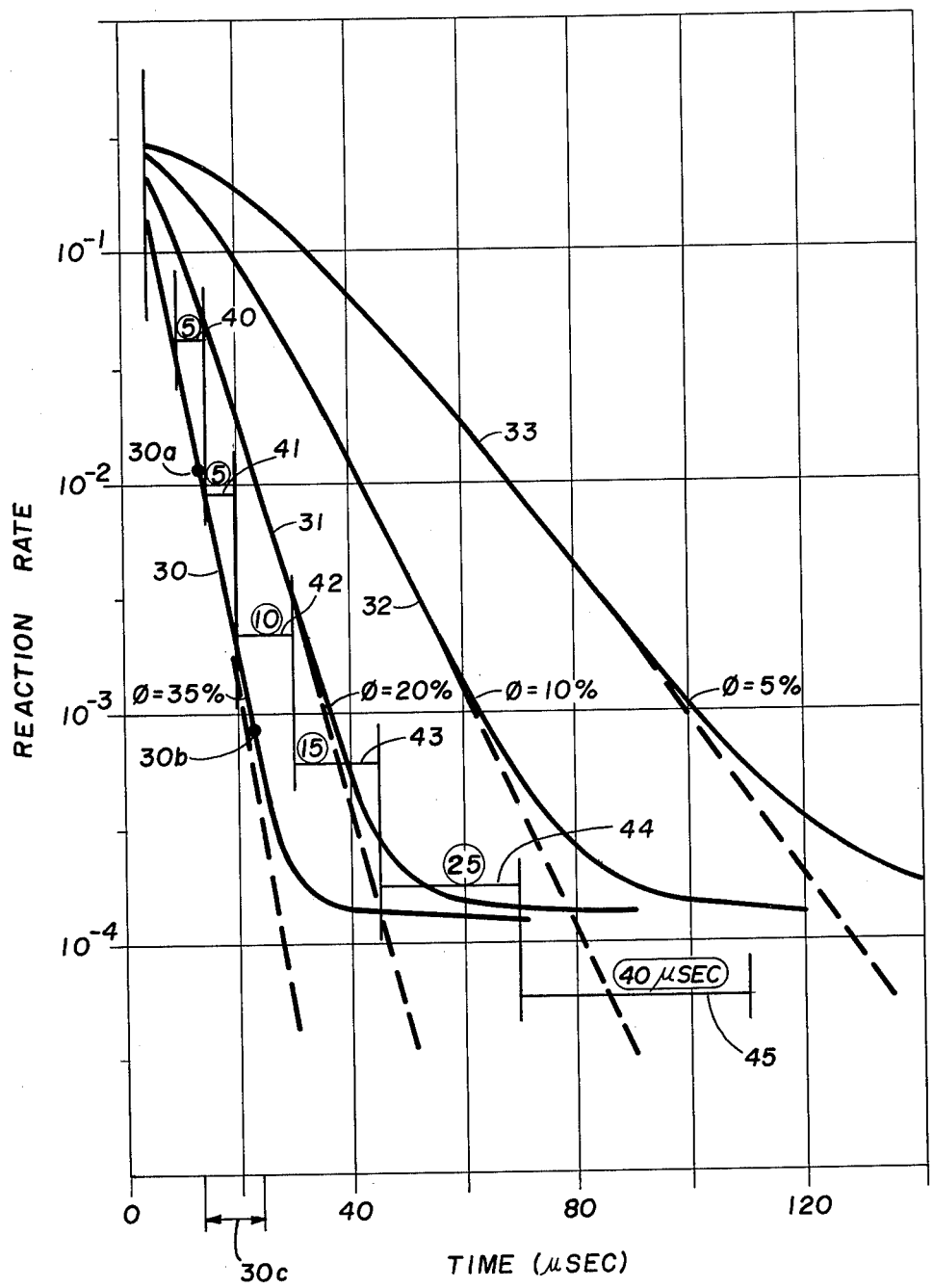
FIG. 5 is a graph illustrating the relationship between the reaction rates and earth formations as a function of time for a plurality of different formation porosities.

FIG. 5 is a plot of the reaction rate, i.e., epithermal neutron counting rate, for detector 13 when provided with an optimum filter such as above described. The data plotted are for matrices having four different levels of porosity. The reaction rates are plotted as a function of time (microseconds) following the termination of each pulse from source 12. Curve 30 represents the reaction rate for a liquid-filled matrix having 35% porosity; curve 31 represents the reaction rate where porosity is 20%; curve 32 for a 10% porosity; and curve 33 for a 5% porosity.

Module 15, FIG. 1, operates automatically and repeatedly to determine the approximate slope of the epithermal neutron reaction rate for any given formation and thus provides an index, from such reaction rates, as to the porosity of the formations. The function generated is an indication of the slope of the reaction rate for a given location.

It will be noted that curves 30-33, FIG. 5, over the reaction rate scale between $10^{-3}$ and $10^{-2}$ are generally of linear character on the semi-log plot. This means the reaction rate curves in this region are almost pure exponential in shape. The linear portion is employed herein as the region for measurement.

Module 15 operates to sample the counting rate at successive pairs of points and then establish and employ a ratio function to determine the approximate slope of the reaction rate effective for a particular formation traversed by tool 10.

For pure exponential decay the relationship between slope $\lambda$ and the ratio R of counting rates of points separated in time by $t_2 - t_1$ is $\log_e R - (t_2 - t_1)\lambda$. Thus, for a given time separation between measuring points a measurement of $\log_e R$ is equivalent to a measurement of $\lambda$.

Curves 30-33 were obtained utilizing a helium-3 detector coated with a cadmium layer of 8 mils thickness and a gadolinium layer of 10 mils thickness. The measurements are for a water-bearing sandstone matrix. It is apparent from FIG. 5 that the number of epithermal neutrons detected by the detector as a function of time decreases far more rapidly in a highly porous hydrogen-filled matrix (curve 30) than in a low-porosity matrix (curve 33). The slope of the particular decay function which is effective at a given location is determined and utilized to evaluate porosity in the manner now to be described.

The approximate slope in the linear zone is determined by sensing the reaction rate in successive time windows and then generating functions which are representative of or proportional to the slope of the decay function. In FIG. 5 the slope of curve 30 in the linear portion thereof is proportional to the logarithm of the ratio of the ordinates of points 30a and 30b divided by a function proportional to the time interval 30c between the abscissas for the ordinates 30a and 30b. Slope is evaluated by sensing epithermal neutrons by the detector 13. The total count is stored for each of a plurality of successively later and longer time windows following each pulse of neutrons from source 12. For each pair of measurements, a ratio function is generated. The first pair of measurements encountered in each series for which the ratio is as high as a predetermined reference level is utilized to indicate porosity.

For example, assume that a burst of radiation begins at $t = 0$, FIG. 5, and lasts for 5 microseconds. Detector 13 then feeds a first counter to integrate the total number of epithermal neutrons counted during a first window 40, from $t = 10$ to $t = 15$ microseconds. Detector 13 then feeds a second counter during window 41, $t = 15$ to $t = 20$ microseconds. A signal representative of the ratio of the counts is generated. The ratio signal is compared with a selected reference value. If the ratio is less than the reference value, then the counts taken during windows 40 and 41 are summed and the ratio is then taken of that sum and the count accumulated during a thrid window 42, i.e., from $t = 20$ to $t = 30$ microseconds. If the ratio still is less than the reference level, the counts in windows 41 and 42 are summed and a ratio taken of that sum and the count in window 43, i.e., from $t = 30$ to $t = 45$ microseconds. If the ratio still is less than the reference level, then the counts taken in windows 42 and 43 are summed and a ratio is obtained of that sum and the count taken in window 44, i.e., from $t = 45$ to $t = 70$ microseconds. If the ratio still is less than the reference level, then the counts taken in windows 43 and 44 are summed and another ratio is obtained of the sum and the count obtained in window 45, i.e., from $t = 70$ to $t = 110$ microseconds. If this ratio is reached, it is used, by default, to measure the die-away rate.

The above sequences represent operations to evaluate the slope of the decay function effective for the matrix then adjacent to tool 10. It will be noted that the windows 40–45 are contiguous. They are selected to be contiguous because of unique simplification possible thereby in circuits utilized for controlling the output of detector 13. The windows may, however, be of different lengths and may be spaced one from another or overlap rather than being contiguous.

In FIG. 5, a basic time unit $\Delta$ of 5 microseconds is employed. The windows have lengths in terms of multiples of the basic time unit $\Delta$. Such a pattern of window lengths is employed in FIG. 6 and in the circuit of FIG. 7, i.e., $\Delta$, $\Delta$, $2\Delta$, $3\Delta$, $5\Delta$, and $8\Delta$.

Figure 6:
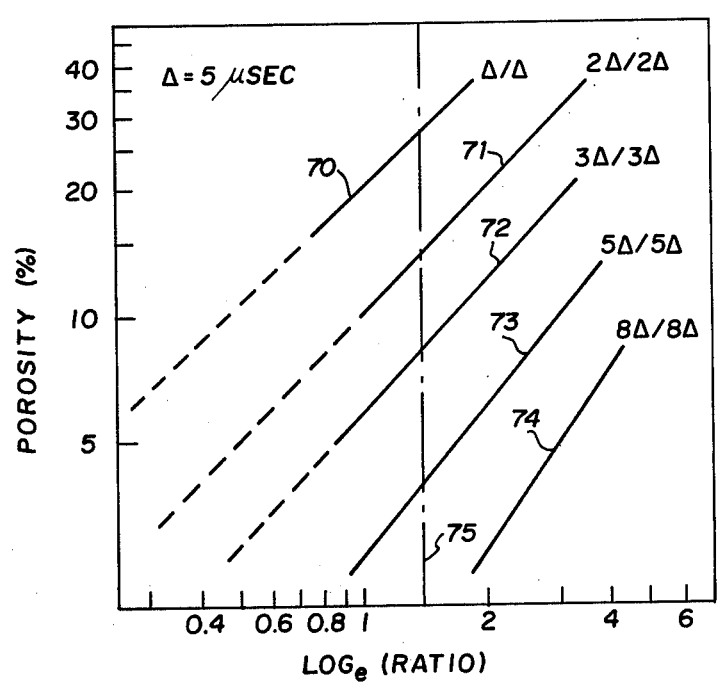
FIG. 6 is a set of curves illustrating the relationship between porosity and counting ratios for various lengths of time windows.

FIG. 6 shows a set of curves that illustrate how the operations described above would proceed and how the value of porosity for a given medium would be determined. Percentage porosity is plotted logarithmically as the ordinate. The natural logarithm of the ratio of counts in contiguous time windows of the foregoing specified lengths is plotted logarithmically as the abscissa. The basic time unit ($\Delta$) is 5 microseconds. Curve 70 shows the variation of $\log_e$ (ratio) with porosity for the ratio of counts measured with windows 40 and 41 in FIG. 5. Curve 71 shows the variation of $\log_e$(ratio) with porosity for the ratio measured with the sum of the counts in windows 40 and 41 and the counts in window 42. Similarly, curve 72 is obtained from the combination of windows 41 plus 42 and window 43, curve 73 from windows 42 plus 43 and window 44, and curve 74 from windows 43 plus 44 and window 45.

An important feature of the curves 70–74 is that they are linear on the log-log plot over the ranges of variable values used. These ranges are indicated by the solid portions of curves 70–74. The curves become nonlinear outside the ranges used, as indicated by the dashed portions of curves 70, 71 and 72.

Line 75, FIG. 6, represents the reference ratio. For illustrative purposes it is assumed that the reference ratio is 4, which means that $\log_e$ (reference ratio) is approximately 1.386.

Selection of the appropriate pair of time windows may be understood and illustrated in FIG. 6 by taking as an example a medium adjacent to tool 10 having a porosity of 10%. With initial windows 40 and 41, each of length $\Delta$, the observed $\log_e$ (ratio) will be about 0.47 according to curve 70. This gives a ratio of about 1.60 which is less than the chosen reference ratio of 4. Thus the counts in windows 40 and 41 will be added and compared to the counts in window 42. The appropriate curve in FIG. 6 is now curve 71, and the observed $\log_e$ (ratio) will be about 1.02. This gives a ratio of about 2.77 which is still less than the chosen reference ratio of 4. The counts in windows 41 and 42 will be added and compared to the counts in window 43. The appropriate curve is 72 and the observed $\log_e$ (ratio) will be about 1.67. This gives a ratio of about 5.31 which exceeds the reference ratio. Thus curve 72 would be used to convert the measured ratio to porosity.

It should be emphasized that the particular values chosen for $\Delta$ and the reference ratio of FIG. 6 have been selected to clarify and make specific the foregoing description of the operation of the invention. Actual values may vary somewhat depending on the conditions under which the system is to function.

Since the lines 70–74 are linear over the ranges of values for which they are used, it is well known that a relation of the following form may be written:

$$\log \phi = A \log (\log \text{ ratio}) + B \tag{1}$$

Thus if constants $A$ and $B$ are determined for each curve 70–74, then from a measured ratio and the use of the correct curve the porosity may be determined by taking the antilogrithm of log $\phi$.

Figure 7:
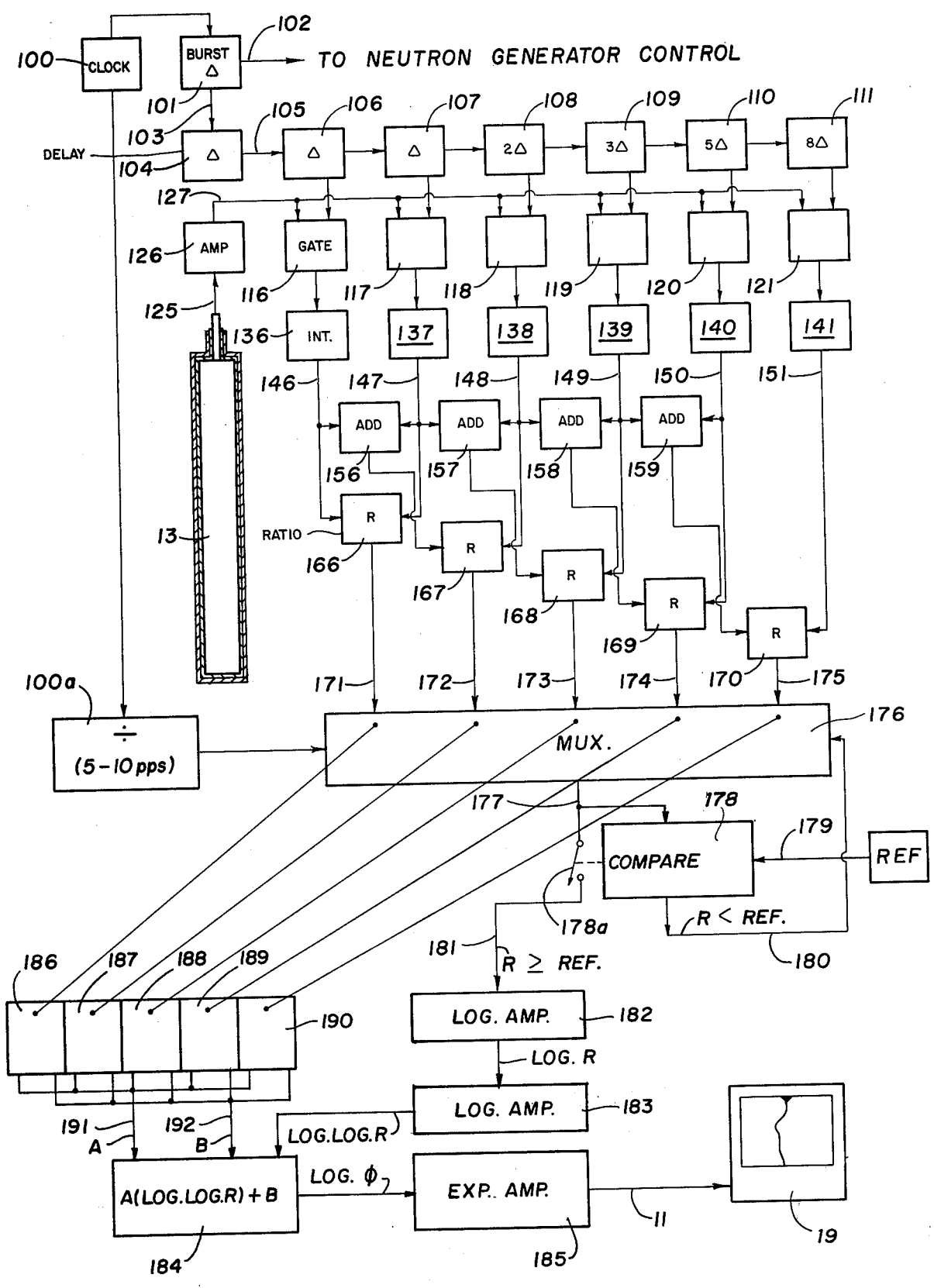
FIG. 7 illustrates a circuit employed in carrying out the present invention.

The circuit of FIG. 7 is representative of a preferred implementation of module 15 for carrying out operations as above described.

A timing pulse source, clock 100, is connected to a burst control unit 101 which has an output 102 leading to the control of the neutron generator 12. Burst control unit 101 is conected by way of channel 103 to a delay unit 104. Unit 104 is connected by channel 105 to the input of the first of a string of monostable multivibrators 106–111. As indicated the duration of the pulse from pulse generator 101 is $\Delta$. Units 104, 106 and 107 have the same pulse duration. Units 108, 109, 110 and 111 have delay intervals of $2\Delta$, $3\Delta$, $5\Delta$ and $8\Delta$, respectively.

The outputs of multivibrators 106–111 are connected to one input of gates 116–121, respectively. The second inputs of the gates 116–121 are supplied from an amplifier 126 which is supplied by way of channel 125 from counter 13.

The outputs of gates 116–121 are connected to inputs of integrators or pulse counters 136–141, respectively. Output channels 146–151 from integrators 136–141 are then connected to units 166–170 in the following manner. Lines 146 and 147 are connected to two inputs of the ratio unit 166. They are also connected to both inputs of an adder 156. The output of adder 156 is connected to one input of ratio unit 167. Output line 148 is connected to the second input of ratio unit 167. Lines 147 and 148 are connected to adder unit 157 the output of which is connected as one input of ratio unit 168. The second input of ratio unit 168 is supplied by way of line 149. Lines 148 and 149 supply two inputs to an adder 158 the output of which is connected to one input of ratio unit 169. The second input of ratio unit 169 is supplied by way of line 150. Lines 149 and 150 are connected as inputs to an adder 159 the output of which is connected to one input of a ratio unit 170. The second input of ratio unit 170 is supplied by line 151.

Thus, the outputs of ratio units 166–170 appear on output lines 171–175, respectively. Output lines 171–175 are connected to five inputs of a multiplexer 176. Multiplexer 176 is switched in response to the output of a pulse divider 100a which is connected at its input to an output of clock 100. Whereas clock 100 operates at the rate of from 5,000 to 10,000 Hz, the divider unit has a pulse output rate of from 5 to 10 Hz.

The output channel 177 of multiplexer 176 is connected as one input to a comparison unit 178. The second input to comparison unit 178 is supplied from a reference source by way of line 179. The output line 177 is also connected by way of a gate shown as a switch 178a to channel 181 leading to a logarithmic amplifier 182. Switch 178a is enabled by actuation of a comparator 178 as will be described. The output of amplifier 182 is connected to a second logarithmic amplifier 183. The output of amplifier 183 is connected to one input of a combination adder/constant multiplier 184. Two other inputs to adder/constant multiplier 184 are supplied from dual constant voltage sources 186–190, depending upon which of the channels of multiplexer 176 is employed in the manner hereafter described. The output of adder/constant multiplier 184 is connected to the input of exponential amplifier 185, the output of which is then applied as a signal input on line 11 to recorder 19.

In operation, as above noted, system clock 100 runs at a selected fixed frequency preferably in the range of from 5 to 10 kHz. Each clock pulse from clock 100 triggers monostable multivibrator 101 to apply on line 102 a control pulse of Δ microsecond duration. The signal on line 102 turns on the neutron generator 12 to produce a burst of radiation. The output on line 103 from unit 101 actuates monostable multivibrator 104 which after a delay of Δ microseconds applies a pulse on line 105 to multivibrator 106. The output from multivibrator 106 is applied to a like unit 107 whose output is applied to a unit 108. The output of unit 108 is applied to unit 109. The output of unit 109 is applied to unit 110. The output of unit 110 is applied to unit 111. Units 106–111 successively enable one input of AND gates 116–121, respectively.

Output pulses from detector 13 appear on line 125 and pass through a conventional shaper in amplifier 126 to appear on bus 127. Bus 127 connects in parallel to one input of each of the AND gates 116–121.

AND gates 116–121 supply integrators 136–141, respectively, with pulses from a detector for the period the associated gates are enabled. The integrators or pulse counters 136–141 accumulate counts representative of the epithermal neutrons detected by detector 13 during controlled fractions of each interval between bursts of neutrons from source 12. Preferably, the burst controlled by a pulse state on line 102 will be of length Δ of about 5 microseconds duration. With unit 104 providing a delay Δ, the gate 116 will be enabled to pass pulses to integrator 136 from detector 13 for an interval beginning Δ after the end of the burst from source 12 and for a period Δ. Integrator 137 then counts for the next period Δ. Integrator 138 counts for the next period 2Δ; integrator 139 for the next period 3Δ; integrator 140 for the next period 5Δ; and integrator 141 for the next period 8Δ. Ratio voltages of the counts are then generated for five periods of equal length; unit 166 for Δ/Δ; unit 167, 2Δ/2Δ; unit 168, 3Δ/3Δ; unit 169, 5Δ/5Δ; and unit 170, 8Δ/8Δ. The five periods are, in this example, contiguous, exclusive and successively later following each burst from generator 12. Clock 100 causes the system to operate to produce on lines 171–175 analog voltages which remain fixed, except for minor statistical variations, for a given matrix and fluid therein but which normally would vary slowly in a well logging environment as the logging tool moves from one formation to another wherein the porosity changes.

Clock 100 supplies clock pulses at the above-described rate to pulse divider 100a to control operation of multiplexer 176. Multiplexer 176 operates in conjunction with a comparator 178 to sequentially compare the ratio voltage on lines 171, 172, 173, 174 and 175 with the reference voltage on line 179. A feedback line 180 is connected to the false output of comparator 178 so that if the voltage on line 171 is less than the voltage on line 179, the multiplexer is switched to apply the voltage on line 172 to comparator 178. If the comparator output is again false, then the voltage on line 173 is applied to the comparator through the multiplexer 176. The foregoing sequence is continued until the voltage applied to the comparator on line 177 equals or exceeds the voltage on line 179. When this condition exists, the selected ratio dependent voltage appears on line 181. It is then modified by the logarithmic amplifier 182, the output voltage of which is the logarithm of the measured ratio. This voltage is the input to a second logarithmic amplifier 183, the output voltage of which is the logarithm of the logarithm of the measured ratio. This output voltage is applied to one input of adder/constant multiplier 184. Voltages A and B are applied on lines 191 and 192 to the other inputs of adder/constant multiplier 184. Voltages A and B are preset pairs of constant voltages. They are caused to appear on lines 191 and 192 by selectively actuating preset sources 186–190. The pairs of voltages from sources 186–190 are characterized as follows. The magnitudes of voltages A are directly proportional to the slopes of lines 70–74, FIG. 6, respectively, and the voltages B are directly proportional to the intercepts of the lines 70–74 with the selected reference level which in FIG. 6 has a value of 4 and is plotted as line 75. The voltages from sources 186–190 are thus related to the constants A and B appearing in Equation (1). The voltage sources 186–190 are selectively actuated as multiplexer 176 applies the voltages on lines 171–175, respectively, to comparator 178. Adder/constant multiplier 184 forms the voltage combination A (log log R) + B which is equal to log $\phi$. The output voltage of 184 is applied to exponential amplifier 185 which takes the antilogarithm of log $\phi$ to produce an output voltage proportional to $\phi$. By this means, an analog voltage representative of porosity appears on output line 11 which leads to recorder 19, FIG. 1.

The analog voltage on cable 11 thus provides a measurement of the porosity of hydrogen-bearing matrices. The measurement is accomplished by irradiating the matrix with successive pulses of high energy neutrons and thereafter sensing as a function of time following each pulse the neutrons passing through the epithermal energy range as they moderate to thermal energy levels. A physical function is generated which is principally dependent upon the die-away rate of the neutrons as they moderate to the thermal levels.

By way of example, the reference voltage on line 179 is selected in conjunction with the lengths and locations in time of the counting windows Δ, Δ, 2Δ, 3Δ, 5Δ and 8Δ so that the ratio R must be about 5. This assures that pulses are counted preferably over intervals during which the epithermal die-away rate functions are nearly linear when expressed on a linear-logarithmic scale such as in FIG. 5.

Figure 8:
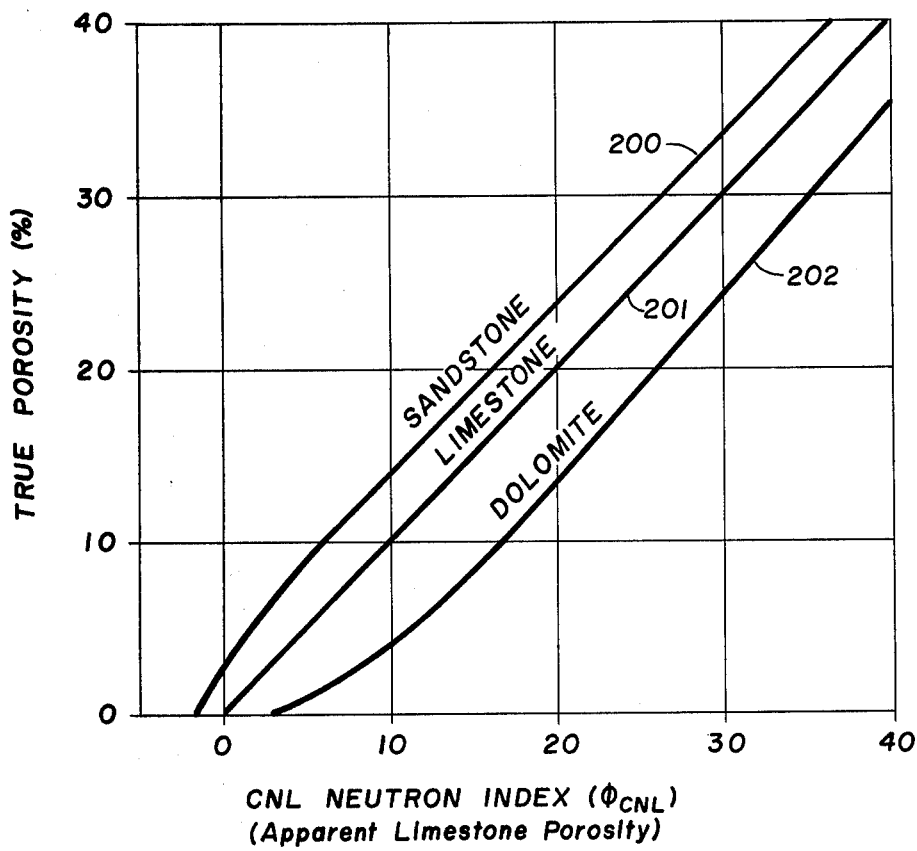
FIG. 8 is a graph showing true vs apparent porosity in three common earth formations for compensated neutron logs in current use.

In order to understand the problem arising from the interference of the rock matrix in the determination of porosity by a conventional neutron logging tool, reference may now be had to FIG. 8. FIG. 8 is a graph showing neutron porosity equivalence curves as generally used in the calibration of dual-detector compensated neutron logs in current use. In FIG. 8, apparent porosity is plotted as abscissa and true porosity is plotted along ordinates thereof.

Curve 200 represents the relationship between apparent and true porosity for sandstone. Curve 201 represents the relationship between apparent and true porosity for limestone and curve 202, for dolomite. It will be noted that only the limestone cuve 201 is linear. This is because calibration is carried out in limestone. The sandstone curve 200 and the dolomite curve 202 are nonlinear. Further, and more significant, the sandstone curve 200 and the dolomite curve 202 are spaced substantially from the limestone curve 201.

The fact that curves 200, 201 and 202 are separated is important to the basis for the present invention. Frequently the character of the rock matrix in the formation at any given depth is not known. The compensated neutron log provides the index, as plotted in FIG. 8. If the apparent porosity index generated by the logging operation is 10, for example, then the dilemma is to decide wheather the true porosity is 3.6% (curve 202), 10% (curve 201) or 14.1% (curve 200), or some porosity in between the foregoing values if two or all three of the rock types are present in unknown proportions. The porosity value depends upon whether or not the formation for which the index was produced was pure sandstone, pure limestone, dolomite or mixtures thereof.

While not illustrated, it is to be understood that a similar dilemma is present in converting the apparent porosity index in conventional sidewall neutron porosity logging operations. It is generally the case that the spread of the curves showing the relationship between apparent and true porosities is not quite so great in sidewall neutron logging as is illustrated in FIG. 8 for the compensated neutron log. In either case, however, the dilemma is present. In order to interpret the logs accurately in terms of true porosity, the nature of the formation must be known.

In contrast, the present invention provides a substantial reduction in dependence upon lithology, essentially eliminating the effects that cause curves 200-202 of FIG. 8 to be spaced apart.

Figure 9:
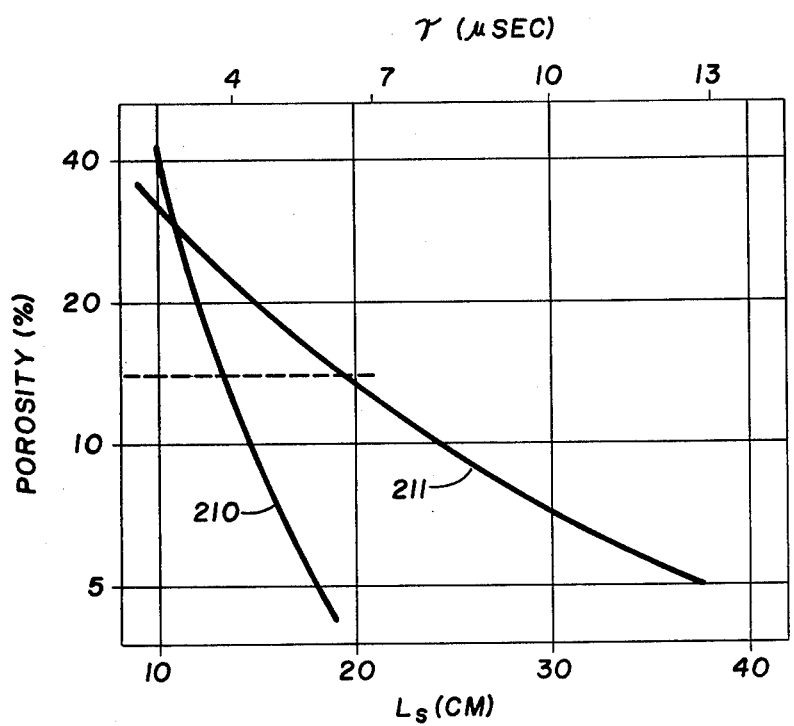
FIG. 9 is a graph showing the increased sensitivity to porosity of the present invention as compared to prior art neutron logging methods.

Referring now to FIG. 9, two curves 210 and 211 have been plotted which can be utilized to illustrate the increased sensitivity to porosity of logging in accordance with the present invention as compared with logging in prior art methods.

In FIG. 9 the abscissa scale at the bottom is plotted in terms of slowing down length (cm). The distance plotted is proportional to the square root of the mean square distance that a neutron travels during its loss of energy from a high energy (5 MeV) level to the epithermal level. Slowing down length is a term of art widely utilized in dealing with neutron transport in matter and is basically the qunatity measured in all current steady-state neutron logging methods. The slowing down length ($L_s$) is plotted in terms of porosity plotted along the ordinates of FIG. 9 on a logarithmic scale. Curve 210 is for a sandstone matrix and shows that at a porosity of 15%, the slowing down length is about 14 cm. If the porosity is changed by 1%, then the slowing down length changes slightly. It has been determined from curve 210 that for a change of one porosity percent, the slowing down length changes by 2.2% of its value.

Curve 211 is a plot of epithermal neutron lifetime for a sandstone matrix. That is, the abscissa at the top of FIG. 9 is plotted in terms of $\tau$ (microseconds). Curve 211 represents the relationship between porosity and the epithermal neutron lifetime which is proportional to the reciprocal of the slope of the approximately linear portion of the curves 30-33 of FIG. 5. Curve 211 is far less steep than curve 210. Thus for a given change in porosity, far greater sensitivity to that change exists in the quantity measured in epithermal die-away. More particularly, if porosity is changed from 15 to 14%, it can be shown that the change in $\tau$ is 5.4%. Thus, by utilizing the fact that the energies of neutrons change with time in accordance with the behavior shown in FIGS. 2a and 2b, an increase in sensitivity to porosity of more than a factor of two is achieved by the present invention over prior systems.

It will further be helpful in understanding the present invention to refer to the following to show the basis for the particularized curves 30-33 of FIG. 5. That is, that shapes of curves 30-33 are dependent upon a particular detector construction. Curves 30-33 are plots of reaction rate as a function of time following cessation of each burst of high energy neutrons, the epithermal neutron resultant of which is to be detected.

It can be shown that the neutron reaction rate as a function of time t for the number of reactions per cubic centimeter-second for an infinite homogenous medium can be expressed as follows:

$$R_{epi}(t) = \int_0^\infty v\, n(v,t)\, \Sigma_r(v)\, dv \tag{2}$$

where:
$v$ = neutron speed
$n$ = neutron density (speed and time dependent)
$\Sigma_r$ = neutron reaction cross section.

Equation (2) is a generalized expression for the response of an epithermal neutron detector. The neutron density, $n(v, t)$, is dependent on the following characteristics of each type of nucleus present in the medium: the relative amount of each nuclear type, its mass, and its nuclear cross section for elastically scattering neutrons.

The neutron reaction cross section for any generalized detector can be determined. Assume, for example, a helium-3 detector having a volume of 1 cubic centimeter with internal pressure at 10 atmospheres and enclosed in a filter. Equation (3) is a generalized expression for the reaction cross section of such a detector.

$$\Sigma_r(v) = \epsilon_{trans}(v) \cdot \Sigma_{He}(v) \tag{3}$$

where:
$\epsilon_{trans}(v)$ = Prob. of transmitting neutron of speed $v$ through filter
$\Sigma_{He}(v) = 0.287/v$ cm$^{-1}$ ($v$ in cm/$\mu$sec)

In Equation (3) $\Sigma_{He}(v)$ is the cross section for counting neutrons having passed through the filter described by the term $\epsilon_{trans}(v)$.

In deriving curves 30-33, two types of filters were considered. Equation (4) is descriptive of a sharp cut-off filter having a step function response with a step at speed $v_c$:

$$\epsilon_{trans}(v) = \begin{cases} 0, & v \le v_c \\ 1, & v \ge v_c \end{cases} \tag{4}$$

Equation (5) is descriptive of the cadmium/gadolinium filtered detector employed in accordance with the present invention.

$$\epsilon_{trans}(v) = \epsilon_{Cd}(v) \cdot \epsilon_{Gd}(v) \tag{5}$$

In Equation (5), $\epsilon_{Cd}(v)$ and $\epsilon_{Gd}(v)$ are the probabilities of transmitting a neutron of speed $v$ through the cadmium and gadolinium filters, respectively. These transmission probabilities may be calculated in a straightforward way by those skilled in the art; they vary only with the thickness and chemical form of the filter material.

It is to be recognized from the curves of FIGURES 2a and 2b that in providing the curves 30–33, FIG. 5, recognition must be given the fact that the output of the netron detector though primarily responsive to epithermal neutrons will also be affected to some extent by the presence of thermal neutrons. This is true whether the filter employed has the step function, represented by Equation (4), or the physically realizable response of Equation (5), because curves 24–26, FIGS. 2a and 2b, show that the high-speed tail of the thermal neutron population overlaps the epithermal population for times sufficiently long.

Equation (6) is therefore expressive of the contribution to curves 30–33 of the thermal neutron population.

$$R_{th}(t) = R_m \left[ \frac{e^{-v_{th}\Sigma_a t}}{1 - e^{-v_{th}\Sigma_a T}} \right] \quad (6)$$

where:
$R_m$ = thermal spectral response
$v_{th}$ = 0.22 cm/$\mu$sec
$\Sigma_a$ = macroscopic thermal neutron absorption cross section of rock plus fluid
$T$ = period between bursts.

The thermal spectral response $R_m$ can be shown to be as described in Equation (7).

$$R_m = \int_0^\infty \Phi_m(v) \Sigma_f(v) \, dv \quad (7)$$

where: $\Phi_m(v)$ = maxwellian flux spectrum.

By combining Equations (2) and (6), the total reaction rate plotted in FIG. 5 can then be expressed as indicated in Equation (8).

$$R(t) = R_{epi}(t) + R_{th}(t) \quad (8)$$

Solutions to Equation (8) for the detector assumed above are plotted as solid curves in FIG. 5 for media having porosities of 35%, 20%, 10% and 5%, respectively. The dashed curves in FIG. 5 are plots of the epithermal reaction rate only, i.e., of the quantity $R_{epi}(t)$.

If a detector is employed in carrying out the present invention having a transmission probability different from curve 13k of FIG. 4, then the curves 30–33 would have different shapes. Thus, it will be understood that the invention is not limited to the particular detector described in connection with FIG. 3, but rather in one aspect involves the relationship between the filter response and the interpretation to be carried out in selecting the detector output employed in establishing the ratio function in the operation of the system of FIG. 7.

Porosity is measured by use of a source of high energy neutron pulses repeatedly to irradiate a medium, with some of the neutrons returning from the medium being detected by an epithermal neutron detector. Time delay units sequentially operable begining a predetermined time after each irradiating pulse generate output control states of the series $\Delta$, $\Delta$, $2\Delta$, $3\Delta$, $5\Delta$, $8\Delta$, where $\Delta$ is a few microseconds in length. Counters connected to the detector and to the delay units count representative numbers of the epithermal neutrons during each of the control states. Ratio functions are generated representative of the ratios of the detected neutrons for successively later equal length combinations of the control states. The ratio functions are compared with a predetermined threshold level. A porosity function is then generated in response to the ratio functions which earliest in time with reference to one of the irradiating pulses bears a predetermined relation to the threshold level.

As will be familiar to those skilled in the art of porosity logging, it is desirable to calibrate all types of porosity logs in a controlled environment wherein porosity is accurately known and fixed. Such a calibration facility, built and operated under the auspices of the American Petroleum Institute, is available at the University of Houston, Houston, Tex. It should be understood that the present invention may be calibrated under known conditions in a manner entirely similar to that used for other porosity logging devices.

Having described the invention in connection with certain specific embodiments thereof, it is to be understood that further modifications may now suggest themselves to those skilled in the art and it is intended to cover such modifications as fall within the scope of the appended claims.

I claim:

1. An epithermal neutron detector which comprises:
   (a) a thermal neutron counter, and
   (b) a filter encasing said counter comprising a layer of cadmium about 8 mils thick and a layer of gadolinium about 10 mils thick to impart a substantially step function response immediately above the thermal neutron energy level.

2. In radioactive well logging where a source of fast neutrons includes a means for producing neutron pulses to irradiate earth formations penetrated by a borehole and where detector means detects resultant epithermal neutrons during successive intervals between said pulses, the method which comprises:
   (a) counting the output of said detector during each of a plurality of time windows following each of said pulses,
   (b) establishing a plurality of ratio functions from the number of neutrons counted during each time window and with the total number of neutrons counted during the preceding pair of time windows,
   (c) comparing said ratio functions with a predetermined reference level, and
   (d) establishing a porosity function in response to one of said ratio functions bearing a predetermined relation to said reference level.

3. The method set forth in claim 2 in which said time windows are of equal length.

4. The method set forth in claim 2 in which said time windows are contiguous one to the other.

5. In a radioactivity well logging system where a source of fast neutrons includes means for impulsing said source to irradiate earth formations and where detector means detects substantially only epithermal neutrons during the successive intervals between said pulses, the improvement which comprises:
   (a) means for counting the output of said detector during a plurality of time windows following each of said pulses,
   (b) means for establishing a ratio function from the number of neutrons counted during each individual time window and the total number of neutrons counted during the immediately preceding time windows having combined time lengths equal to that of said individual time window, said ratio function being proportional to the slope of the epithermal neutron die-away for the formation surrounding the borehole, (c) means for comparing said ratio function with a predetermined reference level, and (d) means for establishing a porosity function in response to each said ratio function which bears a predetermined relation to said reference level.

6. The method of claim 5 in which the length of each of said time windows is equal to the sum of the time intervals of the preceding pair of time windows.

7. The method set forth in claim 6 in which said time windows are contiguous to each other.

8. The method of claim 6 in which the length of the first of said plurality of time windows is of the order of about 5 microseconds.

9. In porosity measurements wherein a source of high energy neutron pulses repeatedly is actuated to irradiate a medium and some of the neutrons emanating from said medium are detected by an epithermal neutron detector, the combination which comprises:

(a) first means cyclically operable beginning with each said pulse for generating a plurality of control pulses of successively equal and longer time intervals the first of which is of a few microseconds in length, (b) a second means connected to said detector and to said first means for sequentially counting representative numbers of said epithermal neutrons during respective ones of said time intervals.

(c) a third means for generating ratio functions representative of the ratios of said representative numbers for successively later equal length combinations of said time intervals, said ratio functions being proportional to the slope of the epithermal neutron die-away for the formation surrounding the borehole, (d) means for comparing said ratio functions successively with a predetermined reference level, and (e) means for establishing a porosity function in dependence upon the ratio function which earliest in time with reference to said pulses bears a predetermined relation to said reference level.

10. The combination set forth in claim 9 in which the time intervals of the first and second pulses from said first means are of equal length and the time interval of each successive pulse thereafter is of a length equal to the sum of the lengths of the preceding pair of time intervals.

11. The combination set forth in claim 10 in which said third means includes means to provide count totals for each said time interval and for the sum of counts for the preceding pair of time intervals.

12. The combination set forth in claim 9 in which said time intervals are exclusive.

13. The combination set forth in claim 9 in which said time intervals are contiguous one to the other.

14. In porosity measurements wherein a source of high energy neutron pulses repeatedly is actuated to irradiate a medium and some of the neturons emanating from said medium are detected by an epithermal neutron detector, the combination which comprises:

(a) time delay units sequentially operable beginning a predetermined time after each said pulse to generate output control states of the series $\Delta$, $\Delta$, $2\Delta$, $3\Delta$, $5\Delta$, $8\Delta$ where $\Delta$ is a few microseconds in length, (b) a set of counters connected to said detector and to said set of delay units for counting representative numbers of said epithermal neutrons during each of said states, (c) means for generating ratio functions representative of the ratios of said representative numbers for successively later equal length combinations of said control states, (d) means for comparing said functions successively with a predetermined threshold level, and (e) means for establishing a porosity function in response to the ratio function which earliest in time with reference to said pulses bears a predetermined relation to said threshold level.

15. In porosity measurements wherein a source of high energy neutron pulses irradiates a medium and some of the neutrons emanating from said medium are detected by an epithermal neutron detector, the combination which comprises:

(a) clock actuated means having a fixed pulse rate of frequency between about 5 kHz to 10 kHz repeatedly to actuate said source for periods of $\Delta$ microseconds, (b) timing units operable beginning $\Delta$ microseconds after each said pulse to generate output control states for each of time intervals $\Delta$, $\Delta$, $2\Delta$, $3\Delta$, $5\Delta$, and $8\Delta$ where $\Delta$ is a few microseconds in length, (c) a set of counters connected to said detector and to said timing units for sequentially counting representative numbers of said epithermal neutrons during each of said time intervals, (d) first means for generating ratio functions representative of the ratios of said representative numbers for the combinations of said time intervals $\Delta/\Delta$, $(\Delta+\Delta)/2\Delta$, $(\Delta+2\Delta)/3\Delta$, $(2\Delta+3\Delta)/5\Delta$ and $(3\Delta+5\Delta)/8\Delta$, (e) seconds means to compare said ratio functions successively with a predetermined threshold level at a sample rate low compared to said fixed pulse rate, and (f) third means to establish a porosity function in response to a selected ratio function which earliest in time following one of said pulses bears a predetermined relation to said threshold level.

16. The combination set forth in claim 15 in which said third means includes:

means for logarithmically amplifying each said selected ratio function, and means for summing (i) the product of the amplified ratio function and a first constant proportional to the length of one member of the combination of said time intervals for which said ratio function bears said predetermined relation to said threshold level, and (ii) a second predetermined constant.

* * * * *

UNITED STATES PATENT AND TRADEMARK OFFICE
CERTIFICATE OF CORRECTION

PATENT NO. : 4,097,737
DATED : June 27, 1978
INVENTOR(S) : William R. Mills, Jr.

It is certified that error appears in the above-identified patent and that said Letters Patent are hereby corrected as shown below:

Column 4, line 39, "die- away" should be -- die-away--.
Column 6, line 16, "$\log_e R - (t_2-t_1)\lambda$" should be --$\log_e R = (t_2-t_1)\lambda$--.
Column 7, line 66, "of" should be --in--.
Column 8, line 19, "conected" should be --connected--.
Column 10, line 17, "repsectively" should be --respectively--.
Column 11, line 9, "10" should be --ten (10)--.
line 44, "qunatity" should be --quantity--.
Column 12, line 5, "that" should be --the--.
line 60, the comma (,) before the equation should be removed.
Column 13, line 4, "netron" should be --neutron--.
Column 14, line 54, "impulsing" should be --pulsing--.

Signed and Sealed this

Fifth Day of December 1978

[SEAL]

Attest:

RUTH C. MASON
Attesting Officer

DONALD W. BANNER
Commissioner of Patents and Trademarks